US012115820B2

(12) United States Patent
Lee

(10) Patent No.: US 12,115,820 B2
(45) Date of Patent: Oct. 15, 2024

(54) TIRE POSITION LEARNING APPARATUS AND METHOD FOR TIRE PRESSURE MONITORING SYSTEM

(71) Applicant: Continental Automotive GmbH, Hannover (DE)

(72) Inventor: BokHee Lee, Gyeonggi-do (KR)

(73) Assignee: Continental Automotive GmbH, Hannover (DE)

( * ) Notice: Subject to any disclaimer, the term of this patent is extended or adjusted under 35 U.S.C. 154(b) by 254 days.

(21) Appl. No.: 17/755,647

(22) PCT Filed: Nov. 10, 2020

(86) PCT No.: PCT/EP2020/081546
§ 371 (c)(1),
(2) Date: May 4, 2022

(87) PCT Pub. No.: WO2021/099170
PCT Pub. Date: May 27, 2021

(65) Prior Publication Data
US 2022/0388353 A1 Dec. 8, 2022

(30) Foreign Application Priority Data

Nov. 18, 2019 (KR) ........................ 10-2019-0147627

(51) Int. Cl.
*B60C 23/00* (2006.01)
*B60C 23/04* (2006.01)

(52) U.S. Cl.
CPC ...... *B60C 23/0416* (2013.01); *B60C 23/0435* (2013.01)

(58) Field of Classification Search
CPC ............ B60C 23/0416; B60C 23/0435; B60C 23/0437; B60C 23/0401; B60C 23/0433;
(Continued)

(56) References Cited

U.S. PATENT DOCUMENTS

2006/0012475 A1\* 1/2006 Froitzheim ........... B60C 23/007
340/8.1
2006/0015286 A1\* 1/2006 Lu ...................... B60C 23/0433
702/140
(Continued)

FOREIGN PATENT DOCUMENTS

FR 2911712 A1 7/2008
JP 2010266314 A 11/2010
(Continued)

OTHER PUBLICATIONS

Korean Office Action issued on Nov. 29, 2021 for the counterpart Korean Patent Application No. 10-2019-0147627.
(Continued)

*Primary Examiner* — Shardul D Patel

(57) ABSTRACT

A tire position learning apparatus for a tire pressure monitoring system, comprising: a plurality of tire module units, each of which is respectively mounted on a tire of the vehicle to detect pressure information and transmit same via an ultra-wide band (UWB) signal; and a vehicle module unit which communicates with the plurality of tire module units via UWB signals so as to detect the individual tire pressures and any tire in which low pressure has occurred.

10 Claims, 4 Drawing Sheets

(58) Field of Classification Search
CPC ..... B60C 23/0442; B60C 23/00; B60K 35/00; B60K 35/22; B60Y 2400/306; B60T 2240/03; B60G 2800/90
USPC .......................................................... 701/29.1
See application file for complete search history.

(56) References Cited

U.S. PATENT DOCUMENTS

| | | | |
|---|---|---|---|
| 2018/0022171 A1* | 1/2018 | Okada ................. | B60C 23/0488 701/33.4 |
| 2018/0229560 A1* | 8/2018 | DeCia ................. | B60C 23/0486 |
| 2018/0290507 A1* | 10/2018 | Usami ................... | G08C 17/00 |
| 2019/0135054 A1* | 5/2019 | Saburi ................. | B60C 23/0416 |
| 2019/0225034 A1* | 7/2019 | Van Wiemeersch ........................ | B60C 23/0479 |
| 2019/0255893 A1 | 8/2019 | Van Wiemeersch et al. | |
| 2020/0254830 A1 | 8/2020 | Sekizawa | |

FOREIGN PATENT DOCUMENTS

| | | |
|---|---|---|
| JP | 2019081437 A | 5/2019 |
| JP | 2019098837 A | 6/2019 |
| KR | 101418515 B1 | 7/2014 |
| KR | 20140080971 A | 7/2014 |
| KR | 101713238 B1 | 3/2017 |

OTHER PUBLICATIONS

The International Search Report and the Written Opinion of the International Searching Authority mailed on Dec. 10, 2020 for the counterpart PCT Application No. PCT/EP2020/081546.
Korean Notice of Allowance Issued on Aug. 17, 2022, for the counterpart Korean Patent Application No. 10-2019-0147627.

* cited by examiner

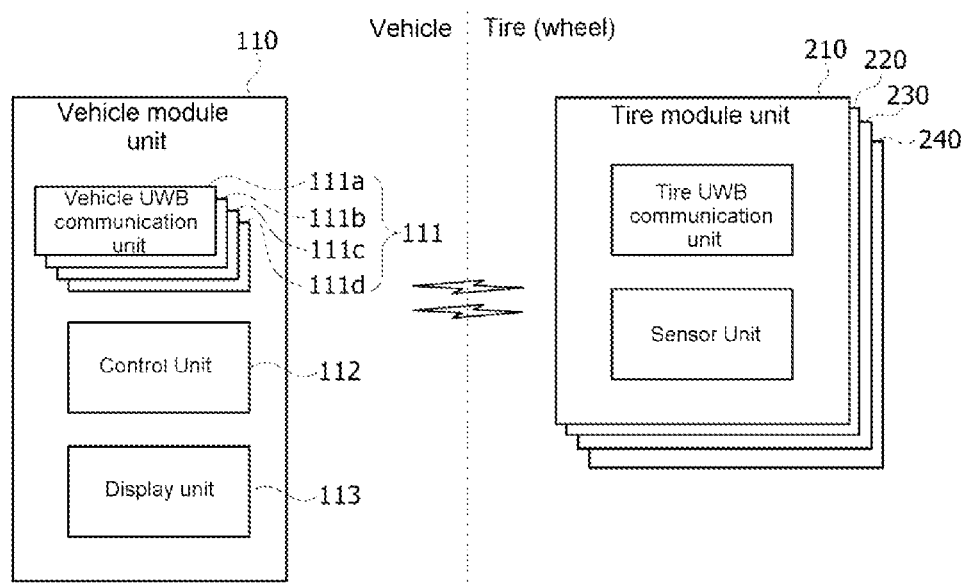
[FIG. 1]

[FIG. 2]
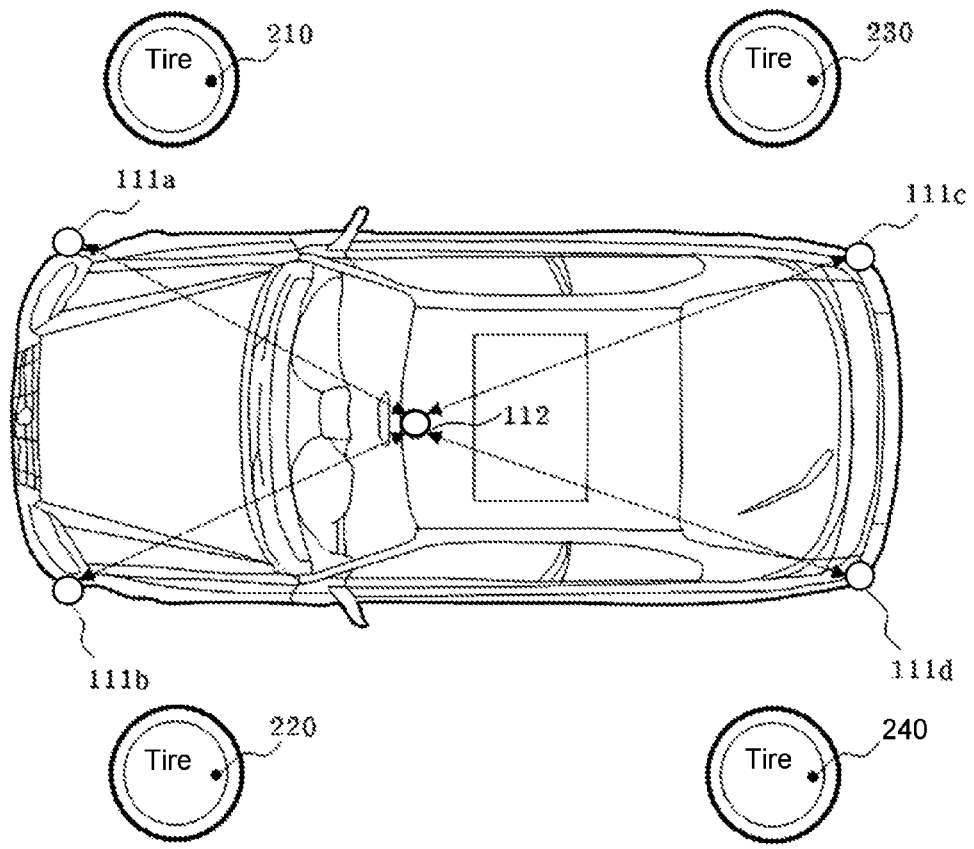

[FIG. 3]
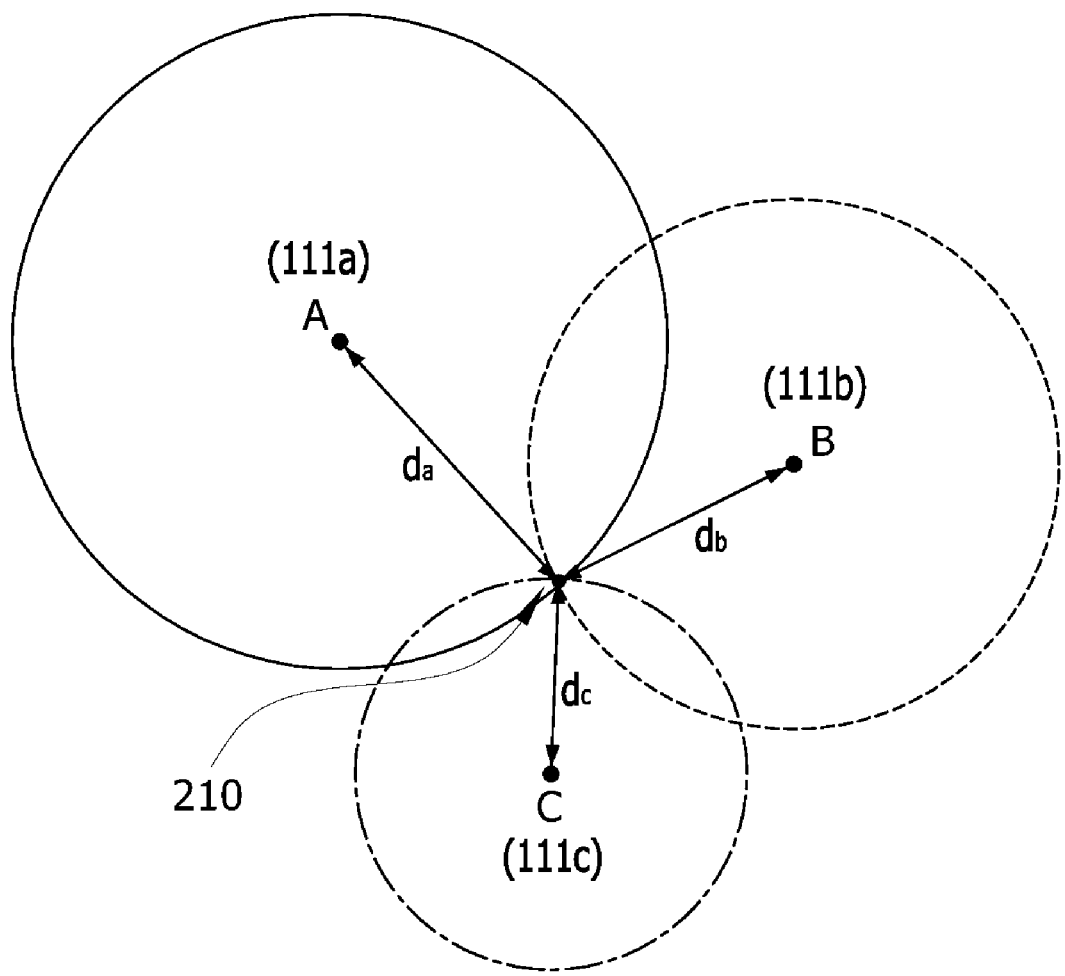

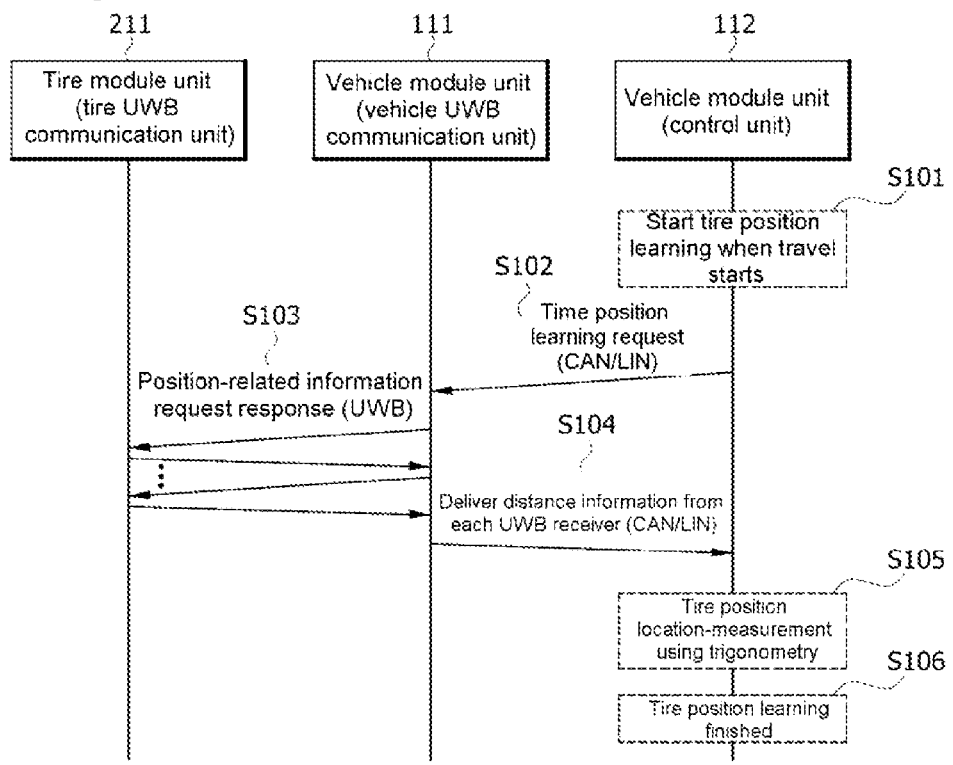

TIRE POSITION LEARNING APPARATUS AND METHOD FOR TIRE PRESSURE MONITORING SYSTEM

CROSS-REFERENCE TO RELATED APPLICATIONS

The present application is a National Stage Application under 35 U.S.C. § 371 of International Application No. PCT/EP2020/081546 filed on Nov. 10, 2020, which claims priority from Korean Patent Application No. 10-1019-0147627 filed in the Korean Intellectual Property Office on Nov. 18, 2019, the disclosures of which are herein incorporated by reference in their entireties.

BACKGROUND

1. Field

The present application relates to a tire position learning apparatus and method for a tire pressure monitoring system, and more specifically relates to a tire position learning apparatus and method for a tire pressure monitoring system (TPMS), which allow the tire position for a tire pressure monitoring system to be learned by using ultra-wide band (UWB) technology.

2. Description of Related Art

In general, technologies for facilitating driving convenience and ensuring vehicle driver safety include vehicular radar, tire air pressure detection devices, remote ignition devices, and geographical information systems.

Meanwhile, among the numerous components of a vehicle, tires are the components which are in direct contact with the road, and thus the tires perform functions such as bearing the weight of the vehicle, delivering the driving force and braking force to the ground and cushioning against impacts from the road surface, and therefore the state of the tires relates directly to the safety of the driver. For this reason, it is necessary to continuously monitor the state of the tires during travel. For example, tire air pressure detection devices measure the pressure and temperature of the tires from sensors installed in the wheels, and notify the user of the pressure and temperature, and thus can prevent the occurrence of defects in the tires in advance.

One such safety apparatus installed in vehicles to prevent such defects in the tires is a tire pressure monitoring system (TPMS). Such tire pressure monitoring systems (TPMS) are systems that give a warning when the tire pressure falls below a reference pressure, by means of a tire module unit (wheel unit, WU), that has been installed in the tire, monitoring the pressure of the tire so as to periodically transmit tire pressure information wirelessly (via a radio frequency (RF)) to an electronic control unit (ECU) inside the vehicle.

But RF (radio frequency) data transceiving methods like the one above involve wireless communication via RF at 434 MHz between the TPMS WU and the electronic control unit (ECU), so problems of the electronic control unit (ECU) being unable to receive the RF signal may occur due to effects such as reflection and fading of the transmitted signal.

Meanwhile, as an additional function of tire pressure monitoring systems (TPMS), there is a function of learning the positions of the tires so as to notify the user of the position of any tire at which low pressure has occurred, and there are two types of method for learning the positions of tires in the prior art.

Firstly, the LF initiator (LFi) method is a method in which low frequency initiators (LFi) are installed in four places in tire adjacent spaces inside the vehicle, an electronic control unit (ECU) controls the LFi to sequentially transmit LF signals toward wheel units (WU) which are installed on each of the wheels (i.e. each of the tires), and then, when each wheel unit (WU) installed on each of the wheels receives the LF signal, the changed tire state is transmitted to the electronic control unit (ECU) using an RF signal, and thus the electronic control unit (ECU) matches the RF received state to the wheel unit (WU) ID thereby learning the tire position. But in this method, since four LFi must be additionally installed on the vehicle, there are the problems of costs increasing and wiring becoming complicated, as well as leading to deterioration in fuel efficiency due to the increase in the weight of the vehicle.

Secondly, in the Loc on Sync method, each wheel unit (WU) installed on each tire transmits an RF signal only at a specific phase (i.e. a specific tire angle), and then, the electronic control unit (ECU) confirms the phase (i.e. angle) of each tire) information for each wheel from wheel speed sensors by communicating with other modules. This is to say, the electronic control unit (ECU) learns the tire position by determining the position with the highest correlation among the phases of each wheel every time a wheel unit (WU) signal for each of the four wheels is collected. But this method has a problem in that, when the vehicle is travelling at a speed of 130 km/h or more, tire position learning mistakes can occur due to specific phase (i.e. tire angle) position measurement errors of the TPMS WU.

Consequently, the situation is such that technology for improving upon the problems of conventional RF and tire position learning techniques is needed.

Background art of the present application is disclosed in Korean Registered Patent 10-1713238 (Registered 28 Feb. 2017, TIRE MONITORING DEVICE AND VEHICLE COMPRISING THE SAME).

SUMMARY

According to one aspect, the present application was created in order to resolve problems such as those described above, and specifically the object of the present application is to provide a tire position learning apparatus and method for a tire pressure monitoring system (TPMS), which allow the tire position in the tire pressure monitoring system to be learned by using ultra-wide band (UWB) technology.

The tire position learning apparatus for a tire pressure monitoring system according to one aspect of the present application is a tire position learning apparatus for a tire pressure monitoring system, characterized by comprising: a plurality of tire module units mounted on a tire of the vehicle respectively so as to detect pressure information and transmit same via an ultra-wide band (UWB) signal; and a vehicle module unit operable to communicate with the plurality of tire module units via UWB signals so as to detect the individual tire pressures and any tire in a position where low pressure has occurred and notifies the user of same.

The vehicle module unit comprises: a plurality of vehicle UWB communication units operable to respectively communicate with the plurality of tire module units via UWB signals.

Each of the plurality of vehicle UWB communication units is respectively mounted in a designated position on the exterior of the vehicle.

The vehicle module unit comprises: a control unit operable to calculate and learn the position of each tire by using distance information measured in a plurality of the vehicle UWB communication units, by using UWB signals respectively transmitted from a plurality of the tire module units, and the distance information is information about the distance from the plurality of vehicle UWB communication units to a plurality of the tire module units.

The vehicle module unit comprises: a display unit operable to display position and pressure information for each tire as calculated and learned in the control unit, and the display unit includes a vehicle dashboard.

The control unit is operable to learn the positions of the tires by using trigonometry on the basis of the information about the distances from respective vehicle UWB communication units to a plurality of the tire module units, and, in order to use trigonometry, the control unit is operable to use distance information with respect to one tire module unit, as detected in at least three vehicle UWB communication units.

The tire module unit comprises: a sensor unit operable to detect the pressure of the tire; and a tire UWB communication unit operable to wirelessly output tire pressure information, that has been detected by means of the sensor unit, using a UWB signal.

The tire position learning method for a tire pressure monitoring system according to another aspect of the present application is a tire position learning method for a tire pressure monitoring system, characterized by comprising: a step in which a plurality of tire module units, each of which is respectively mounted on a tire of the vehicle, detects pressure information for each tire and transmits same via an ultra-wide band (UWB) signal; and a step in which a vehicle module unit communicates with the plurality of tire module units via UWB signals so as to detect the individual tire pressures and any tire in a position where low pressure has occurred and notifies the user of same.

To communicate with the plurality of tire module units via UWB signals, the vehicle module unit comprises a plurality of vehicle UWB communication units each of which respectively communicates with the plurality of tire module units via UWB signals.

To detect the positions of the tires, in the vehicle module unit, the control unit calculates and learns the position of each tire on the basis of distance information measured in a plurality of the vehicle UWB communication units, by using the UWB signals respectively transmitted from the plurality of tire module units, and the distance information is information about the distance from the plurality of vehicle UWB communication units to a plurality of the tire module units.

To detect the positions of the tires and notify the user of same, the vehicle module unit comprises: a display unit which displays position and pressure information for each tire as calculated and learned in the control unit, and the display unit includes a vehicle dashboard.

To calculate and learn the position of each tire, the control unit learns the positions of the tires by using trigonometry on the basis of the information about the distances from respective vehicle UWB communication units to a plurality of the tire module units, and, in order to use trigonometry, the control unit uses distance information with respect to one tire module unit, as detected in at least three vehicle UWB communication units.

In the step in which the plurality of tire module units detects pressure information for each tire and communicates same via ultra-wide band (UWB) signals, sensor units of the tire module units detect the pressures of the tires and the UWB communication units of the tire module units wirelessly output the tire pressure information, that has been detected by means of the sensor units, using UWB signals.

According to one aspect, the present application specifically allows the tire position in a tire pressure monitoring system (TPMS) to be learned by using ultra-wide band (UWB) technology.

BRIEF DESCRIPTION OF THE DRAWINGS

FIG. 1 is an illustrative drawing showing a schematic configuration of the tire position learning apparatus for a tire pressure monitoring system according to one embodiment of the present application.

FIG. 2 is an illustrative drawing for explaining the mounting positions of the plurality of vehicle UWB communication units (111a-111d) in FIG. 1.

FIG. 3 is an illustrative drawing for explaining a method for measuring the distance from the plurality of vehicle UWB communication units to each of the tire module units in FIG. 1.

FIG. 4 is a flowchart for explaining the tire position learning method for a tire pressure monitoring system according to one embodiment of the present application.

DETAILED DESCRIPTION

Hereinafter, an embodiment of the tire position learning apparatus and method for a tire pressure monitoring system according to the present application will be described with reference to the accompanying drawings.

In this process, the thickness of lines or the size of the components shown in the drawings may be exaggerated for clarity of the description and convenience. In addition, the terms used in the following text are defined in relation to their functions in the present application, and can vary depending on the intention of the user or operator, or on customary practice. Thus, definitions of such terms should be made based on the content throughout the entirety of this specification.

FIG. 1 is an illustrative drawing showing a schematic configuration of the tire position learning apparatus for a tire pressure monitoring system according to one embodiment of the present application, and FIG. 2 is an illustrative drawing for explaining the mounting positions of the plurality of vehicle UWB communication units (111a-111d) in FIG. 1.

As shown in FIG. 1, the tire position learning apparatus for a tire pressure monitoring system according to the present embodiment comprises: a vehicle module unit (110); and a plurality of tire module units (210, 220, 230, 240).

The vehicle module unit (110) comprises: a plurality of vehicle ultra-wide band (UWB) communication units (111a-111d); a control unit (112); and a display unit (113).

Each of the plurality of tire module units (210-240) comprises: a tire UWB communication unit (211); and a sensor unit (212).

Each of the plurality of vehicle ultra-wide band (UWB) communication units (111a-111d) is mounted at a designated position on the exterior of the vehicle (e.g. the wheel lateral edge portion of the vehicle exterior) (see FIG. 2).

The plurality of vehicle ultra-wide band (UWB) communication units (111a-111d) can receive ultra-wide band (UWB) signals transmitted from the plurality of (at least three) tire module units (210-240) so as to measure distance (i.e. the distances from each vehicle UWB communication unit to a plurality of the tire module units) (see FIG. 3).

FIG. 3 is an illustrative drawing for explaining the method for measuring the distance from the plurality of vehicle UWB communication units (111a-111d) to each of the tire module units (210-240) in FIG. 1.

Here, the time of flight (ToF, flight-time distance measurement) method can be used in order to accurately measure distance, in that the distances from the plurality of vehicle UWB communication units (111a-111d) to each tire module unit (210-240) change in real-time in accordance with the rotation of the tires during vehicle travel, and consequently the control unit (112) can calculate and learn the positions of the tires on the basis of the distance information (i.e. the distances from the vehicle UWB communication units to each tire module unit).

It should be noted that, the UWB technology is technology which has evolved from existing local area wireless technology such as Wi-Fi, Bluetooth, and GPS, and has the characteristic of being able to process situational information such as the UWB anchor position, anchor movement, and the distance to other equipment to an accuracy of a number of centimeters, which has been difficult in the prior art.

The control unit (112) calculates and learns the position of each tire by using information about distance (i.e. the distances from each vehicle UWB communication unit to the plurality of tire module units) measured by the plurality of vehicle UWB communication units (111a-111d) each receiving the UWB signals transmitted from the plurality of tire module units (210-240).

The display unit (113) displays position and pressure information for each tire as calculated and learned in the control unit (112). For example, the display unit (113) can display the position information of the tire by utilizing the vehicle dashboard.

The tire UWB communication units (211) wirelessly output the tire pressure information, that has been detected by means of the sensor unit (212), using UWB signals.

The sensor unit (212) comprises a sensor which detects the pressure of the tire.

Here, the sensor unit (212) is implemented so as to be able to perform the function of a control unit, and the plurality of tire module units (210-240) may also be each provided with additional control units.

FIG. 4 is a flowchart for explaining the tire position learning method for a tire pressure monitoring system according to one embodiment of the present application.

With reference to FIG. 4, the control unit (112) of the vehicle module unit (110) starts (S101) tire position learning during vehicle travel, and directs (S102) tire position learning requests to the vehicle UWB communication unit (111) depending on the designated vehicle communication method (e.g. CAN, LIN).

Consequently, the vehicle UWB communication unit (111) repeats (S103) the request for position-related information and response by using the tire UWB communication unit (211) and a UWB signal.

For example, the plurality of vehicle UWB communication units (111a-111d) receives UWB signals transmitted from the plurality of (at least three) tire module units (210-240) and thereby measure the distances therefrom (i.e. the distances from each vehicle UWB communication unit to a plurality of the tire module units). Here, the distances from the plurality of vehicle UWB communication units (111a-111d) to each tire module unit (210-240) change in real-time in accordance with the rotation of the tires during vehicle travel.

Consequently, the vehicle UWB communication unit (111) delivers (S104) information about the distances to each tire module unit (210-240), to the control unit (112) of the vehicle module unit (110) in accordance with the designated vehicle communication method (e.g. CAN, LIN).

Consequently, as shown in FIG. 3, the control unit (112) calculates and learns (S105) the positions of the tires on the basis of the information about distance (i.e. the distances from the vehicle UWB communication units to each tire module unit).

It should be noted that, in the method for measuring distance using ultra-wide band (UWB) signals, there is little effect with regard to signals received via a multipath as the method uses a designated wireless band and impulse response (IR). With wireless signals that pass via any usual multipath, the signal strength changes in an irregular manner due to reflection off the surroundings when signals overlap at a single time point as the phase changes, or there is attenuation, but, in the case of ultra-wide band signals, the effects caused by a multipath on change of phase and strength are small and so it is possible to stably measure the signal strength. Consequently, the present embodiment makes it possible to accurately find the position of the tire through trigonometry by using the stable signal strength dependent on the distance.

When learning the positions of the tires as described above is completed, learning is finished (S106).

As described above, the present embodiment has the advantageous effect of allowing the tire position in a tire pressure monitoring system (TPMS) to be learned by using ultra-wide band (UWB) technology.

The present application has been described above with reference to the embodiments depicted in the drawings, but the embodiments are merely illustrative, and it will be understood by those of ordinary skill in the field to which the application belongs that various modifications thereto and other equivalent embodiments are possible. Therefore, the scope of technical protection of the present application should be determined by the following claims. Furthermore, the embodiment described in the present specification can be realized as, for example, a method or process, apparatus, software program, data stream or signal. Despite being discussed only in the context of a single form of embodiment (for example, discussed only as a method), embodiments of the discussed feature can also be realized in other forms (for example, an apparatus or program). Apparatuses can be implemented with appropriate hardware, software and firmware etc. Methods can be implemented in apparatuses such as processors which are generally called processing devices which, for example, include computers, microprocessors, integrated circuits and programmable logic devices. Processors include communication devices that facilitate communication of information between end users, such as computers, cellphones, mobile or personal information terminals (personal digital assistants, PDAs) and other devices.

The invention claimed is:

1. A tire position learning apparatus comprising:
   a tire module unit mounted on a tire of a vehicle, the tire module unit configured to detect a pressure of the tire and transmit pressure information signals corresponding to the pressure via an ultra-wide band (UWB) signal; and
   a first vehicle module unit mounted on a first position of the vehicle, the first vehicle module unit configured to receive the pressure information signals via the UWB signal and determine first distance information of a first distance between the tire module unit and the first vehicle module unit as the tire module unit rotates in accordance with rotation of the tire during travel of the vehicle based on the pressure information signals;

a second vehicle module unit mounted on a second position of the vehicle, the second vehicle module unit configured to receive the pressure information signals via the UWB signal and determine second distance information of a second distance between the tire module unit and the second vehicle module unit as the tire module unit rotates in accordance with rotation of the tire during travel of the vehicle based on the pressure information signals;

a third vehicle module unit mounted on a third position of the vehicle, the third vehicle module unit configured to receive the pressure information signals via the UWB signal and determine third distance information of a third distance between the tire module unit and the third vehicle module unit as the tire module unit rotates in accordance with rotation of the tire during travel of the vehicle based on the pressure information signals; and a control unit configured to determine a position of the tire mounted on the vehicle based on the first distance information, the second distance information, and the third distance information.

2. The tire position learning apparatus according to claim 1, wherein the first vehicle module unit, the second vehicle module unit, and the third vehicle module unit comprises a vehicle UWB communication unit configured to communicate with the tire module unit via the UWB signals.

3. The tire position learning apparatus according to claim 2, wherein the vehicle UWB communication unit is mounted on an exterior of the vehicle.

4. The tire position learning apparatus according to claim 1, further comprising a display unit configured to display position information corresponding to the position of the tire mounted on the vehicle and the pressure of the tire, and
wherein the display unit is disposed on a dashboard of the vehicle.

5. The tire position learning apparatus according to claim 4, wherein the first vehicle module unit is configured to determine the first distance based on a time of flight (ToF) of the UWB signal between the tire module unit and the first vehicle module unit,
wherein the second vehicle module unit is configured to determine the second distance based on a time of flight (ToF) of the UWB signal between the tire module unit and the second vehicle module unit,
wherein the third vehicle module unit is configured to determine the third distance based on a time of flight (ToF) of the UWB signal between the tire module unit and the third vehicle module unit, and
wherein the control unit is configured to determine the position of the tire mounted on the vehicle using trigonometry on the basis of the first distance, the second distance, and the third distance.

6. The tire position learning apparatus claim 5, wherein the tire module unit comprises:
a sensor unit configured to detect the pressure of the tire; and
a tire UWB communication unit configured to wirelessly output the tire pressure signals corresponding to the pressure detected by the sensor unit using a the UWB signal.

7. A tire position learning method comprising:
receiving from a tire module unit mounted on a tire of a vehicle pressure information signals corresponding to a pressure of the tire mounted on the vehicle via an ultra-wide band (UWB) signal;
determining first distance information of a first distance between the tire module unit and a first vehicle module unit mounted on a first position of the vehicle as the tire module unit rotates in accordance with rotation of the tire during travel of the vehicle based on the pressure information signals;
determining second distance information of a second distance between the tire module unit and a second vehicle module unit mounted on a second position of the vehicle as the tire module unit rotates in accordance with rotation of the tire during travel of the vehicle based on the pressure information signals;
determining third distance information of a third distance between the tire module unit and a third vehicle module unit mounted on a third position of the vehicle as the tire module unit rotates in accordance with rotation of the tire during travel of the vehicle based on the pressure information signals; and
determining a position of the tire mounted on the vehicle based on the first distance information, the second distance information, and the third distance information.

8. The tire position learning method according to claim 7, wherein the receiving comprises;
receiving the pressure information signals from the tire module unit by the first vehicle module unit;
receiving the pressure information signals from the tire module unit by the second vehicle module unit; and
receiving the pressure information signals from the tire module unit by the third vehicle module unit.

9. The tire position learning method according to claim 7, further comprising displaying position information corresponding to the position of the tire mounted on the vehicle and the pressure information of the tire on a dashboard of the vehicle.

10. The tire position learning method according to claim 9, wherein determining the first distance information comprises the first vehicle module unit determining the first distance based on a time of flight (ToF) of the UWB signal between the tire module unit and the first vehicle module unit,
wherein determining the second distance information comprises the second vehicle module unit determining the second distance based on a time of flight (ToF) of the UWB signal between the tire module unit and the second vehicle module unit,
wherein determining the third distance information comprises the third vehicle module unit determining the third distance based on a time of flight (ToF) of the UWB signal between the tire module unit and the third vehicle module unit, and
wherein determining the position of the tire comprises determining the position of the tire mounted on the vehicle using trigonometry on the basis of the first distance, the second distance, and the third distance.

* * * * *